US006425412B2

(12) United States Patent
Sterling

(10) Patent No.: US 6,425,412 B2
(45) Date of Patent: Jul. 30, 2002

(54) DUAL SPRING EXHAUST VALVE LINKAGE ASSEMBLY

(76) Inventor: Robert E. Sterling, P.O. Box 2822, Spokane, WA (US) 99220-2822

(*) Notice: Subject to any disclaimer, the term of this patent is extended or adjusted under 35 U.S.C. 154(b) by 0 days.

(21) Appl. No.: 09/775,948

(22) Filed: Feb. 2, 2001

Related U.S. Application Data

(60) Provisional application No. 60/180,007, filed on Feb. 3, 2000.

(51) Int. Cl.[7] ................................ F16K 15/00

(52) U.S. Cl. ........................ 137/527; 60/324; 123/523; 251/303

(58) Field of Search ........................ 137/527; 123/523; 60/324; 251/303, 279

(56) References Cited

U.S. PATENT DOCUMENTS

| | | | | |
|---|---|---|---|---|
| 810,542 A | | 1/1906 | Kahlenberg | |
| 955,979 A | | 4/1910 | Murphy | |
| 1,055,270 A | | 3/1913 | Griffith | |
| 1,163,128 A | | 12/1915 | Brauer | |
| 1,330,265 A | | 2/1920 | Hinton | |
| 1,365,852 A | | 1/1921 | Richmond | |
| 1,375,621 A | | 4/1921 | Wright, Jr. | |
| 1,613,322 A | | 1/1927 | Goetz | |
| 1,818,796 A | | 8/1931 | Feyens | |
| 2,072,372 A | | 3/1937 | Kingsley | |
| 2,428,708 A | * | 10/1947 | Heftler | 137/527 |
| 2,960,178 A | | 11/1960 | De Lorean | |
| 3,234,924 A | | 2/1966 | May | |
| 3,391,756 A | | 7/1968 | Larkfeldt et al. | |
| 3,842,932 A | | 10/1974 | Gibel | |
| 3,969,895 A | | 7/1976 | Krizman | |
| 4,033,428 A | | 7/1977 | Wennerstrom | |
| 4,161,996 A | | 7/1979 | Dolejsi | |
| 4,367,807 A | | 1/1983 | Fink et al. | |
| 4,478,244 A | * | 10/1984 | Garrett | 137/527 |
| 4,609,068 A | | 9/1986 | Backlund | |
| 4,707,987 A | | 11/1987 | Atkin | |
| 4,903,486 A | | 2/1990 | Finkle | |
| 5,072,753 A | * | 12/1991 | Ackroyd | 137/527 |
| 5,146,949 A | * | 9/1992 | Retzloff et al. | 137/527 |
| 5,305,787 A | * | 4/1994 | Thygesen | 137/527 |
| 5,355,673 A | | 10/1994 | Sterling et al. | |
| 5,500,494 A | | 3/1996 | Ligman | |
| 5,767,459 A | | 6/1998 | Sell | |
| 5,772,179 A | * | 6/1998 | Morinigo et al. | 123/90.11 |

FOREIGN PATENT DOCUMENTS

| | | |
|---|---|---|
| GB | 678619 | 9/1952 |
| IT | 479646 | 4/1953 |
| IT | 556847 | 2/1957 |
| IT | 623754 | 8/1961 |

OTHER PUBLICATIONS

Popular Science, p. 86, "Smart Exhaust," by Stuart F. Brown, Jan. 1990.

* cited by examiner

*Primary Examiner*—William C. Doerrler
*Assistant Examiner*—John Bastianelli
(74) *Attorney, Agent, or Firm*—Christensen O'Connor Johnson Kindness PLLC

(57) ABSTRACT

A linkage assembly including a crank arm, first and second elongated links, and first and second springs. Ends of the links are adjacent one another and overlap. The first spring is held within this overlapping portion. The second spring is held about an unoverlapped portion of the second link. In a neutral position, the first and second links are balanced in force. In an open position, the first and second links are moved away from one another, causing the second link to be less compressed than the first link. In a back pressure position, the first and second links are moved toward one another, causing the first link to be less compressed than the second link. The first and second springs are held such that they are balanced in the neutral position and provide a restorative force in the open and back pressure positions.

14 Claims, 4 Drawing Sheets

DUAL SPRING EXHAUST VALVE LINKAGE ASSEMBLY

CROSS-REFERENCE TO RELATED APPLICATION

This application claims priority to U.S. Provisional Application No. 60/180,007, filed Feb. 3, 2000, the benefit of which is hereby claimed under 35 U.S.C. § 119(e).

FIELD OF THE INVENTION

The present invention relates to an exhaust system for an internal combustion engine including a flow-regulating valve responsive to pressure in the system.

BACKGROUND OF THE INVENTION

Performance and efficiency of internal combustion engines are affected by the characteristics of their exhaust systems. When designing an exhaust system, compromises must be made concerning engine performance at different speeds. For a static exhaust system, pressure downstream of the engine will vary with engine speed. Low or negative pressure helps to suck exhaust gas from the combustion chamber and, during valve overlap, to draw in a fresh fuel-air mixture. On the other hand, high positive pressure interferes with expulsion of exhaust gas from the engine and, during valve overlap, interferes with the incoming air-fuel mixture. Thus it is important to get the an appropriate amount of pressure at the downstream locations.

Particularly for high performance engines in which exhaust systems are designed to minimize pressure during valve overlap at high engine speeds for maximum power, exhaust systems have been proposed with special mufflers having throttle valves to restrict exhaust flow through the mufflers at low engine speeds in order to lessen or eliminate "back pressure."

One such systems is described in U.S. Pat. No. 5,355,673. This patent describes an exhaust valve that can be incorporated in an otherwise conventional exhaust system, preferably by coupling to the exhaust end of the conventional exhaust pipe. The '673 valve has an internal butterfly valve which is spring-biased to an essentially closed position to restrict flow through the pipe. However, under high flow conditions the valve is swung against the force of the biasing spring to an open position in which flow is essentially unrestricted. Under back pressure conditions, the valve swings oppositely, but still constitutes a substantial obstruction to exhaust flow.

A linkage assembly provides biasing components that respond to the pressure conditions within the tube and seek to return the valve to a neutral stance. The assembly includes a pair of elongated links positioned adjacent one another. A single compression spring is held along the overlap portion. During high flow or back pressure conditions, the plate moves the links apart from one another, causing compression of the single spring. Once the pressure is relieved, the compressed spring moves the plate back to its neutral position.

While this system is acceptable, repeated compression of the spring may lead to a loss of spring compression. This can cause the linkage assembly to become sluggish in returning the valve plate to its neutral position. Thus, a need exists for a linkage assembly that avoids causing spring compression loss. The present invention is directed to this need and others as described below.

SUMMARY OF THE INVENTION

In accordance with the present invention, a linkage assembly is described for use with an exhaust valve having an exhaust tube. The linkage assembly includes a crank arm, first and second elongated links, and first and second springs. One end of the first link is rotatably connected to the crank arm. One end of the second link is rotatably connected to the tube. The remaining ends of the links are adjacent one another and overlap. The first spring is held within this overlapping portion. The second spring is held about the second link.

The linkage assembly includes a neutral position in which the first and second links are generally transverse with the crank arm and the first and second springs are balanced in force. An open position is provided in which the crank arm is rotated to move the first and second links away from one another, causing the second link to be less compressed than the first link. A back pressure position is also provided in which the crank arm is rotated to move the first and second links toward one another, causing the first link to be less compressed than the second link.

In accordance with other aspects of the invention, in one embodiment, both the first and second springs are held in compression in the neutral, open, and back pressure configurations.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is an improved linkage assembly for use with a multi-position valve. The present invention is described herein as applied to the multi-position exhaust valve shown in U.S. Pat. No. 5,355,673, incorporated by reference herein. Such exhaust valve is coupled to a conventional exhaust system of an internal combustion engine. Example applications are shown and described below with reference to FIGS. 4, 5, and 6.

Figure 1:
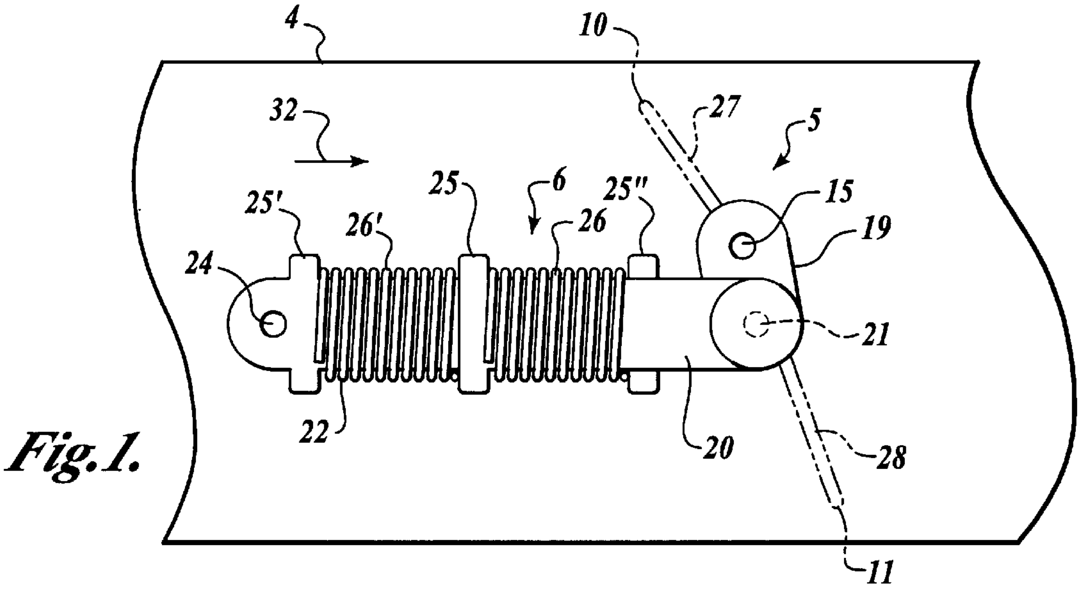
FIG. 1 is a side view of a linkage assembly formed in accordance with the present invention and shown in a neutral position.

Referring to FIG. 1, the example exhaust valve includes an exhaust tube 4 and an internal adjustable flow-restricting member, such as a valve plate 5. The present invention is a spring-biased linkage assembly 6, shown in FIGS. 1–3 as externally mounted to the tube 4. As described below, the linkage assembly 6 controls the position of the valve plate 5 as a function of the pressure of gas in the exhaust tube 4 in such a way as to minimize the obstruction during high flow conditions and maximize the obstruction during low flow or back pressure conditions. As used herein, the term "back pressure" refers to circumstances in which the pressure on the forward (or inlet) side of the valve is less than the pressure on the back (or outlet) side.

The valve plate 5 is centered in the exhaust tube 4. In one embodiment, the transverse axis about which the plate rotates is slightly offset from the exact center of the tube. The plate 5 has an arcuate top edge 10. In the illustrated neutral position, the top edge 10 is closely adjacent to the inner periphery of the top of the exhaust tube. The plate 5 has a bottom arcuate edge 11. In the neutral position, the bottom edge 11 is closely adjacent to the inner periphery of the bottom portion of the tube. The side edges are positioned close to the inner periphery of the side portions of the exhaust tube. Consequently, in the neutral position of the valve plate, the major portion of the internal area of the exhaust tube is obstructed, and any flow around the edges of the valve plate tends to be turbulent so that the exhaust tube is essentially blocked. The plate 5 is secured to a horizontal shaft 15. The plate 5 is swingable relative to the tube 4 by rotation of the shaft 15.

Still referring to FIG. 1, the link assembly 6 includes a crank arm 19, a first flat elongated link 20, and a second flat elongated link 22. One end of shaft 15 extends through the tube and is fastened to the crank arm 19. The crank arm 19 is connected to the shaft 15 such that rotation of the plate 5 and shaft 15 causes similar rotation of the crank arm 19 as well.

The first link 20 has a trailing end portion pivotally connected to the crank arm 19 by a pivot pin 21 at a location distal to the crank arm connection to the shaft 15. The second link 22 has a leading end portion rotatably connected to a short lug projecting from the exhaust tube 4 by a pivot pin 24. The leading end portion of the first link 20 and the trailing end portion of the second link 22 extend parallel to one another with portions overlapping.

The leading end portion of the first link 20 includes a transversely extending projection 25. The leading end portion of the second link 22 includes a transversely extending projection 25'. The trailing end portion of the second link includes a transversely extending projection 25". The links are positioned parallel and adjacent one another such that they overlap between the first link leading end and the second link trailing end. The projections 25 and 25" thereby form stops for opposite ends of a first spring 26. The projections 25' and 25 also form stops for opposite ends of a second spring 26'. The first and second links 20, 22 are sized to accommodate the use of the two springs 26, 26'.

Springs 26 and 26' are of generally helical shape, except that each ring or loop of the helix is substantially rectangular to fit closely around the overlapping portions of links 20 and 22, and the second link 22, respectively. Other shapes are possible depending on the space available for a particular valve application and the shape of the links themselves.

As seen in the embodiment of FIG. 1, the horizontal shaft 15 on which the valve plate 5 is mounted is positioned such that the distance from the shaft to the bottom of the tube 4 is roughly twice the distance from the shaft to the top of the tube. The shaft divides the valve plate into a flat upper portion 27 and a flat lower portion 28, with the lower portion 28 having an area greater than the area of the upper portion 27.

The valve plate lower portion 28 extends downward and slightly rearward from the shaft 15. In one embodiment, the upper portion 27 of the valve plate is not coplanar with the lower portion 28. Rather, in the neutral position, the upper portion 27 extends upward and slightly forward from the shaft 15. In the neutral position of FIG. 1, the upper portion 27 is approximately 35° forward from an imaginary vertical line, and the lower portion 28 is approximately 20° rearward from the same line. Thus, the upper and lower portions are about 15° offset from one another.

Figure 2:
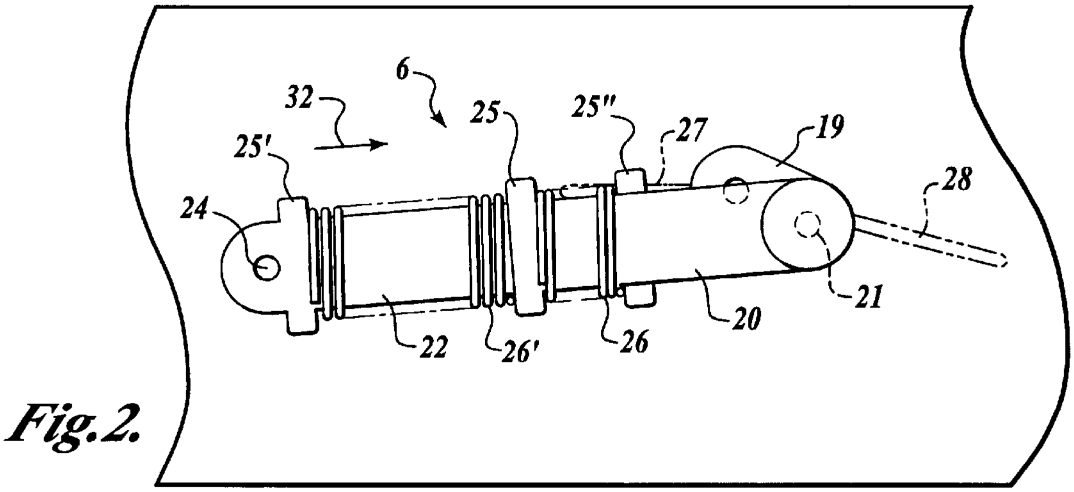
FIG. 2 is a side view of the assembly of FIG. 1, shown in an open position.
Figure 3:
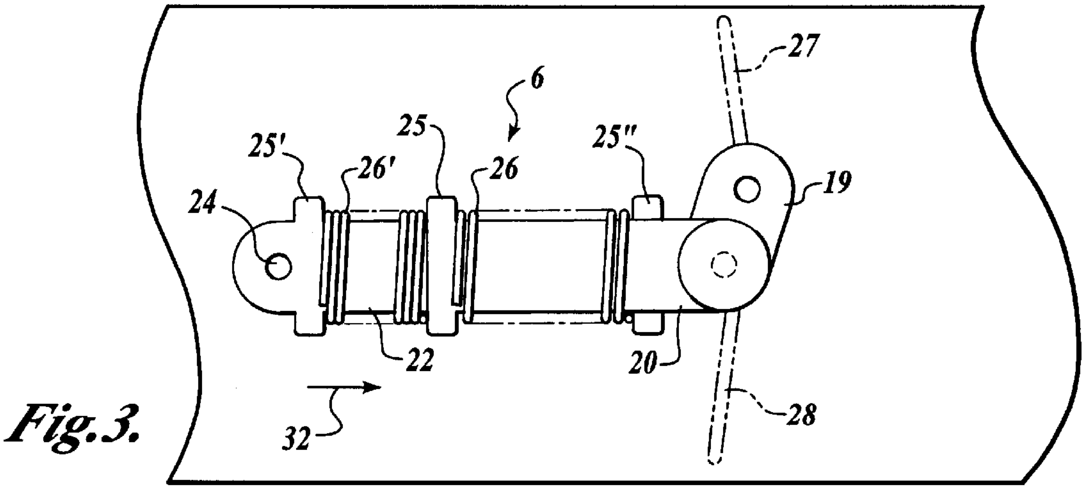
FIG. 3 is a side view of the assembly of FIG. 1, shown in a back pressure position.

Referring to FIGS. 1–3, the normal direction of exhaust flow is indicated by the arrow 32. FIG. 1 illustrates the link assembly 6 in a neutral position.

Depending on the application, the springs 26, 26' may be held in tension or compression. In one embodiment, shown in FIG. 1, the first and second links 20, 22 are oriented transverse to the crank arm 19 when the valve 5 is in the neutral position. At the neutral position, both the first spring 26 and the second spring 26' are in compression and are balanced with equal magnitude forces acting against one another. The first and second springs may be held unforced in the neutral position, but this arrangement is not preferred because it tends to result in a looser system, prone to chattering. In addition, if the springs are arranged such that tension is used, then a small hole or other mechanism should be provided to maintain the spring ends at their respective stops.

For a high flow condition shown in FIG. 2, greater force is exerted by the exhaust gas against the larger lower portion 28 of the plate 5 than against the smaller upper portion 27. At high flow conditions, the valve plate 5 is swung from the central position indicated toward an open position as shown. This causes the crank arm 19 to move counterclockwise from neutral, with the first spring 26 becoming more compressed while the second spring 26' becomes less compressed. In the embodiment of FIG. 1, swinging movement of the valve is limited by compression of the first spring 26 to such a degree that the coils or loops of the helix become tightly engaged, also referred to herein as "fully compressed". In one embodiment, the first spring 20 is constructed so as to allow approximately 55° of swinging movement of the valve plate. Consequently, in the open position, the smaller upper plate portion 27 extends substantially parallel to the length of the exhaust tube 4, and the lower portion 28 of the plate inclines slightly downward. In such position, there is very little resistance to exhaust flow through the tube.

Referring to FIG. 3, in a back pressure condition, as can occur at low to medium engine speeds in a conventionally-designed system, the valve plate 5 is swung oppositely. This causes the crank arm 19 to move clockwise from neutral, with the second spring 26' becoming more compressed while the first spring 26 has become less compressed. As in the open position, maximum travel from the neutral position is limited by the characteristics of the springs and the lengths of the links.

In one embodiment, the maximum travel of the plate 5 from the neutral position is about 55°. In the back pressure condition, the exhaust tube 4 is still substantially blocked by the valve plate. Thus, under back pressure conditions, the exhaust tube is essentially blocked by the valve plate 5, whereas in normal flow conditions the exhaust tube is opened increasingly for increasing exhaust flow. In a representative embodiment, internal pressure of about one to one and one-half pounds per square inch above atmospheric pressure in the exhaust tube 4 is sufficient to swing the valve plate from its central position to its most rearward or most forward swung position.

For all positions of the valve plate, the springs of the linkage assembly preferably exert a force on the mechanical components. As a result, all components are held relative to each other and there is little likelihood of chattering or rattling. The system remains quiet regardless of the operating speed or rapid fluctuations in exhaust flow or pressure.

As will be appreciated by those skilled in the art, this linkage arrangement provides a restorative force to the linkage to return the valve to the neutral position. The additional spring 26' gives the crank arm a more solid neutral stance. Each spring can be used to limit the travel of the linkages. Various spring characteristics may be tried to result in the most beneficial arrangement for a given application. In one embodiment, the first and second springs are allowed to fully compress when in open and back pressure positions, respectively. This completely stops further relative movement between the links and further rotation of the crank arm in either direction.

In addition, a user of the present invention may easily modify the springs to alter the position of the plate 5 in the neutral position. By changing spring characteristics (e.g., by using springs of unequal stiffness), the center stop 25 may be made to rest more forward or more backward. This, in turn, changes the relative location of the plate to the exhaust flow for all position. The arrangement shown is believed to provide the smoothest functioning of the assembly.

Figure 4:
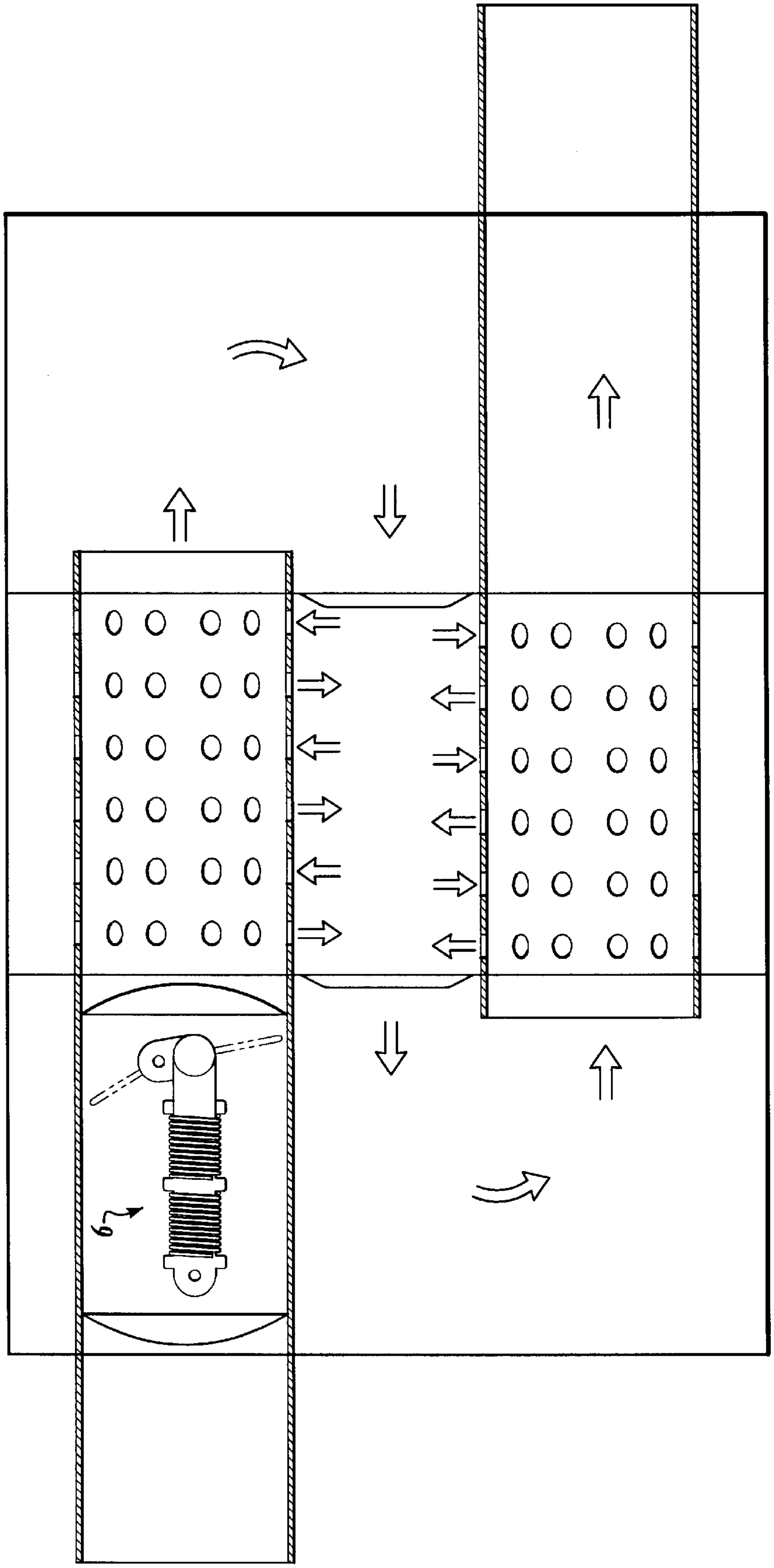
FIG. 4 is a plan view of the assembly of FIG. 1, as installed in a one-pass muffler.
Figure 5:
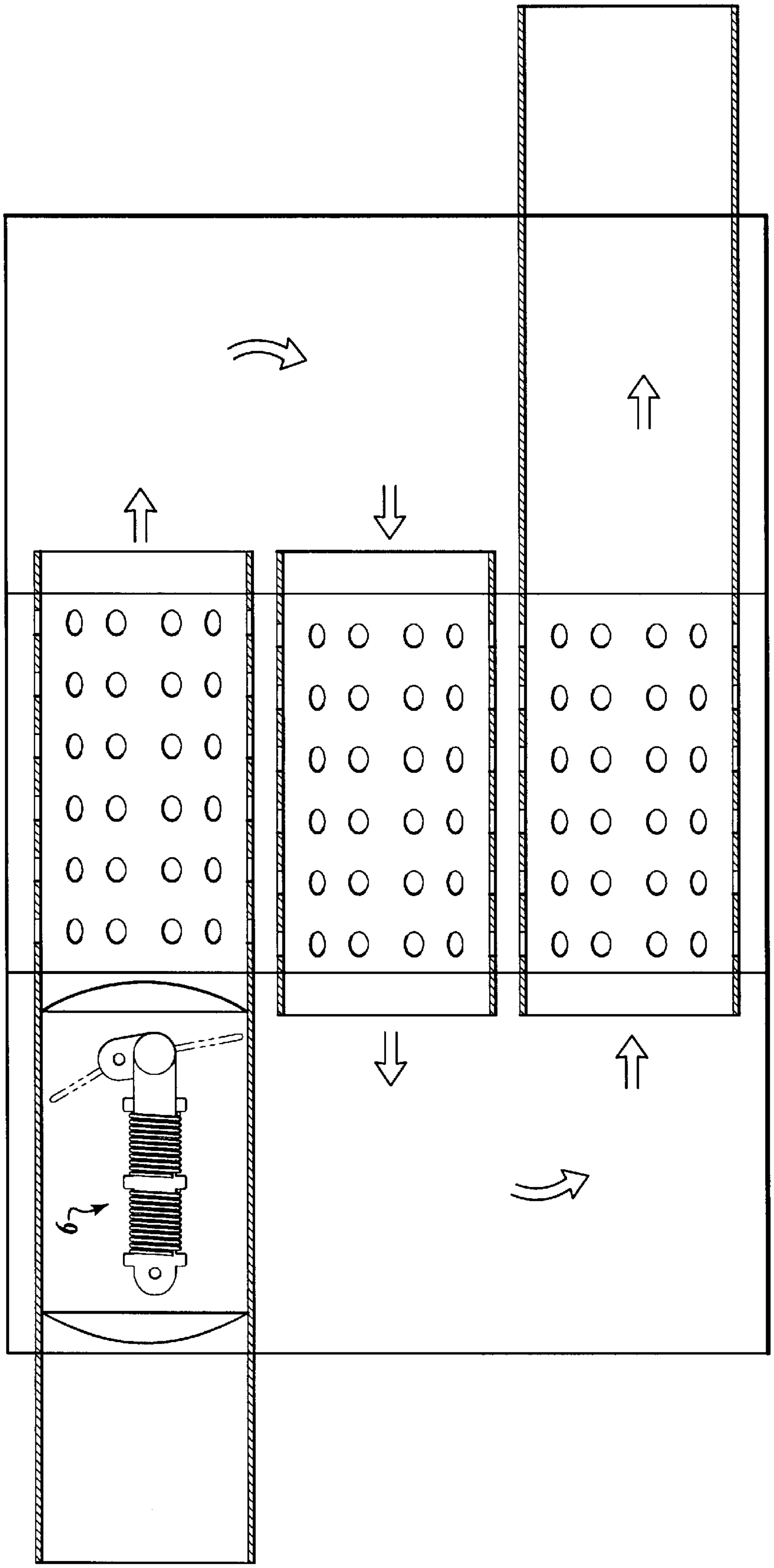
FIG. 5 is a plan view of the assembly of FIG. 1, as installed in a two-pass muffler.
Figure 6:
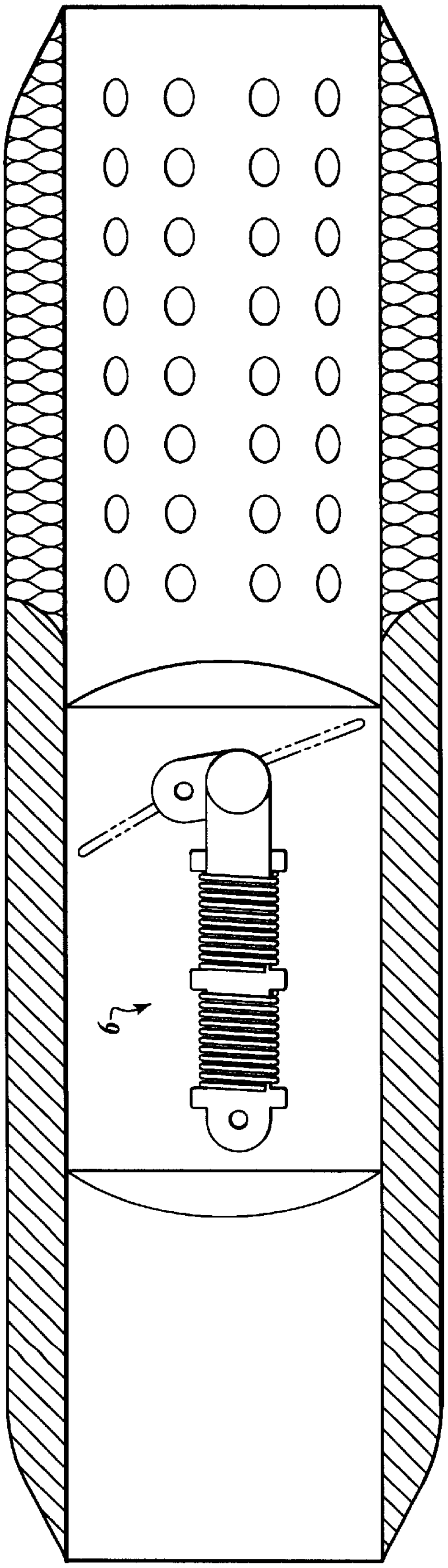
FIG. 6 is a plan view of the assembly of FIG. 1, as installed in a glass pack muffler.

Referring to FIGS. 4, 5, and 6, the link assembly of the present invention may be installed in various types of mufflers, in the inlet or the outlet. It can be installed in an accessory chrome or stainless exhaust tips. It can be used in a three-pass muffler as well as a one- or two-pass muffler. The link assembly and valve can be coupled to the end of a conventional exhaust pipe by a standard fitting.

While the preferred embodiment of the invention has been illustrated and described, it will be appreciated that various changes can be made therein without departing from the spirit and scope of the invention. For example, other combinations of spring compression and tensioning may be used.

The embodiments of the invention in which an exclusive property or privilege is claimed are defined as follows:

1. In an exhaust valve having a valve plate connected to a shaft located crosswise within an exhaust tube, the valve plate and shaft capable of corresponding rotation relative to the tube; the valve plate having first and second portions, the second portion having greater surface area than the first portions; and improvement comprising a linkage assembly including:

(a) a rank arm connected to one end of the shaft;

(b) a first elongated link having a leading end protrusion and a trailing end rotatably connected to the crank arm at a location distal to the crank arm connection to the shaft;

(c) a second elongated link having a leading end with a leading end protrusion and a trailing end with a trailing end protrusion; the leading end of the second link being rotatably connected to the exhaust tube; the second link being located parallel and adjacent the first link with portions of the first and second links overlapping;

(d) a first spring positioned about the overlap portion of the first and second links, between the leading end protrusion of the first link and the trailing end protrusion of the second link; and (e) a second spring positioned about the second link between the leading end protrusion of the first link and the leading end protrusion of the second link;

wherein the linkage assembly includes a neutral position in which the first and second links are generally transverse with the crank arm, and the first and second springs bias the links and the crank arm to the neutral position; an open position in which the crank arm is rotated to move the first and second links away from one another, causing the second spring to be less compressed than the first spring; and a back pressure position in which the crank arm is rotated to move the first and second links toward one another, causing the first spring to be less compressed than the second spring.

2. The improvement according to claim 1, wherein the first and second springs are balanced in compressive force in the neutral position.

3. The improvement according to claim 1, wherein in the open position, the first spring is fully compressed and the second spring is in compression though not fully compressed.

4. The improvement according to claim 1, wherein in the back pressure position, the second spring is fully compressed and the first spring is in compression though not fully compressed.

5. The improvement according to claim 1, wherein the linkage assembly is moved between the open and back pressure positions depending on the direction of exhaust flow through the tube impinging upon the second valve plate portion.

6. The improvement according to claim 1, wherein the crank arm is approximately orthogonal to the first link in the neutral position.

7. The improvement according to claim 1, wherein the crank arm rotates in opposite directions in going from the neutral position to the open position and in going from the neutral position to the back pressure position.

8. The improvement according to claim 1, wherein in the open position the tube is substantially unobstructed.

9. The improvement according to claim 1, wherein the crank arm and first and second links are located exterior to the exhaust tube.

10. A linkage assembly for use with an exhaust valve having an exhaust tube, the linkage assemble comprising:

(a) a crank arm having one end rotatably connected to a stationary location in the valve tube;

(b) a first elongated link having a leading end protrusion and a trailing end rotatably connected to the crank arm;

(c) a second elongated link having a leading end with a leading end protrusion and a trailing end with a trailing end protrusion; the leading end of the second link adapted to rotatably connect to the exhaust tube; the second link being located parallel and adjacent the first link with portions of the first and second links overlapping;

(d) a first spring held in compression about the first and second links between the first link leading end protrusion and the second link trailing end protrusion; and (e) a second spring held in compression about the second link between the first link leading end protrusion and the second leading end protrusion;

wherein the linkage assembly includes a neutral position in which the first and second links are generally transverse with the crank arm and the first and second springs are balanced in compressive force; an open position in which the crank arm is rotated to move the first and second links away from one another, causing the second spring to be less compressed than the first spring; and a back pressure position in which the crank arm is rotated to move the first and second links toward one another, causing the first spring to be less compressed than the second spring.

11. The improvement according to claim 10, wherein in the open position, the first spring is fully compressed and the second spring is still in compression.

12. The improvement according to claim 10, wherein in the back pressure position, the second spring is fully compressed and the first spring is still in compression.

13. The improvement according to claim 10, wherein the crank arm is approximately orthogonal to the first link in the neutral position.

14. The improvement according to claim 10, wherein the crank arm rotates in opposite directions in going from the neutral position to the open position and in going from the neutral position to the back pressure position.

* * * * *

UNITED STATES PATENT AND TRADEMARK OFFICE

CERTIFICATE OF CORRECTION

PATENT NO. : 6,425,412 B2 
DATED : July 30, 2002
INVENTOR(S) : R.E. Sterling

It is certified that error appears in the above-identified patent and that said Letters Patent is hereby corrected as shown below:

<u>Column 5,</u>
Line 42, "portions; and improvement" should read -- portions, an improvement --

<u>Column 6,</u>
Line 52, "second leading end" should read -- second link leading end --

Signed and Sealed this

Twenty-fifth Day of March, 2003

JAMES E. ROGAN
*Director of the United States Patent and Trademark Office*